Jan. 12, 1954 M. N. KAPLAN 2,666,155
ELECTROMAGNETIC TRANSMISSION
Filed Feb. 3, 1951 5 Sheets-Sheet 2

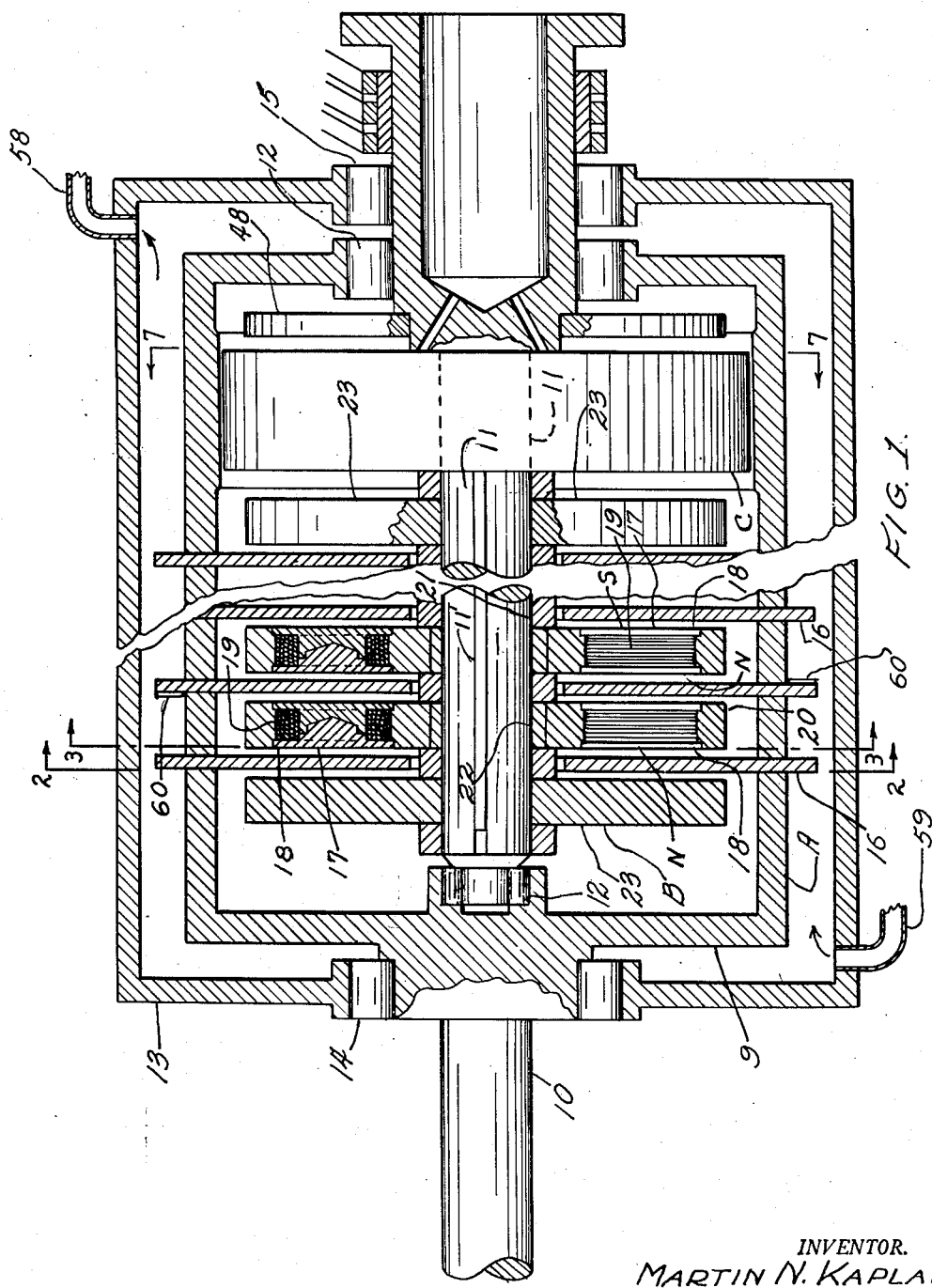

INVENTOR.
MARTIN N. KAPLAN
BY
ATTORNEY

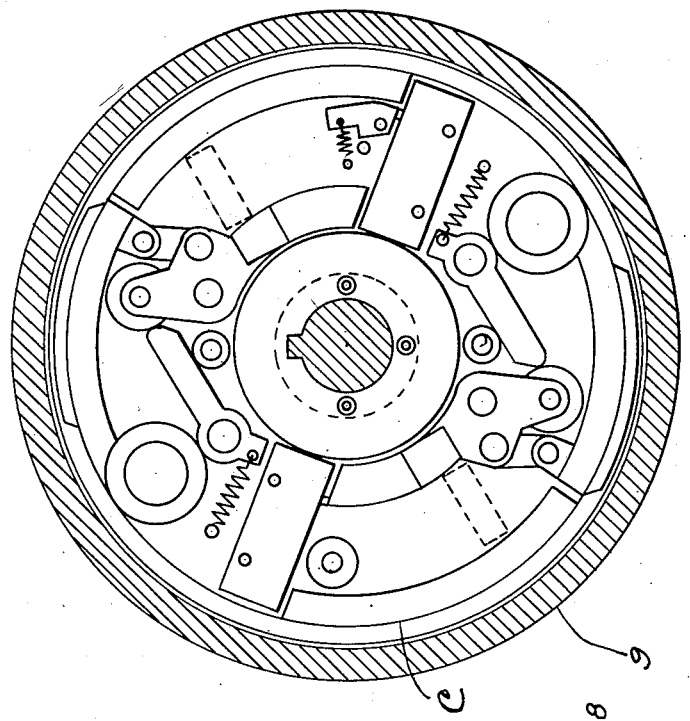
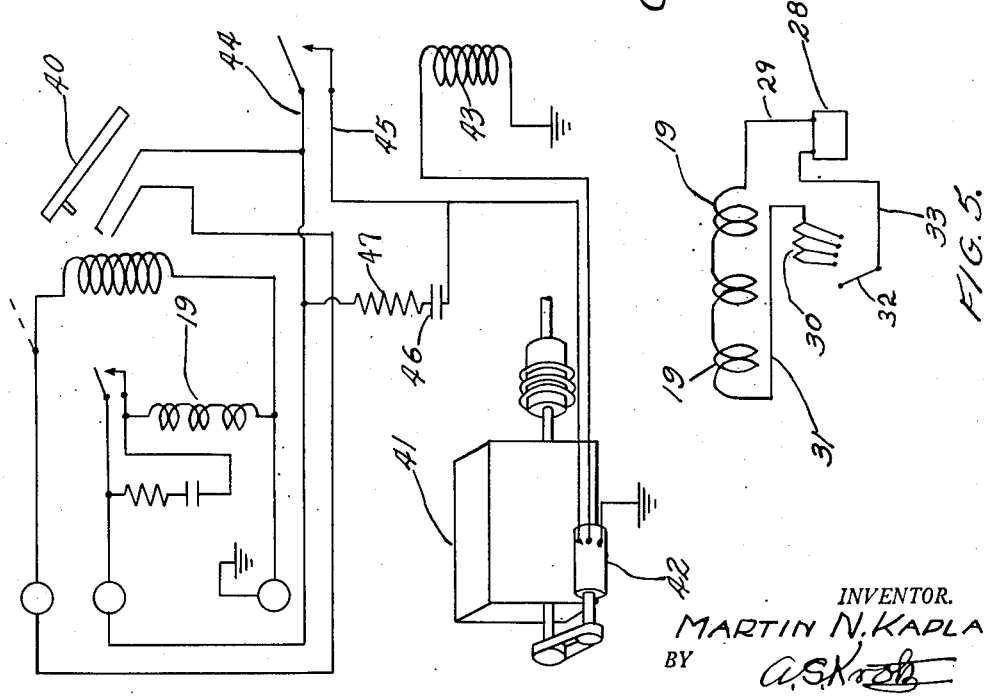

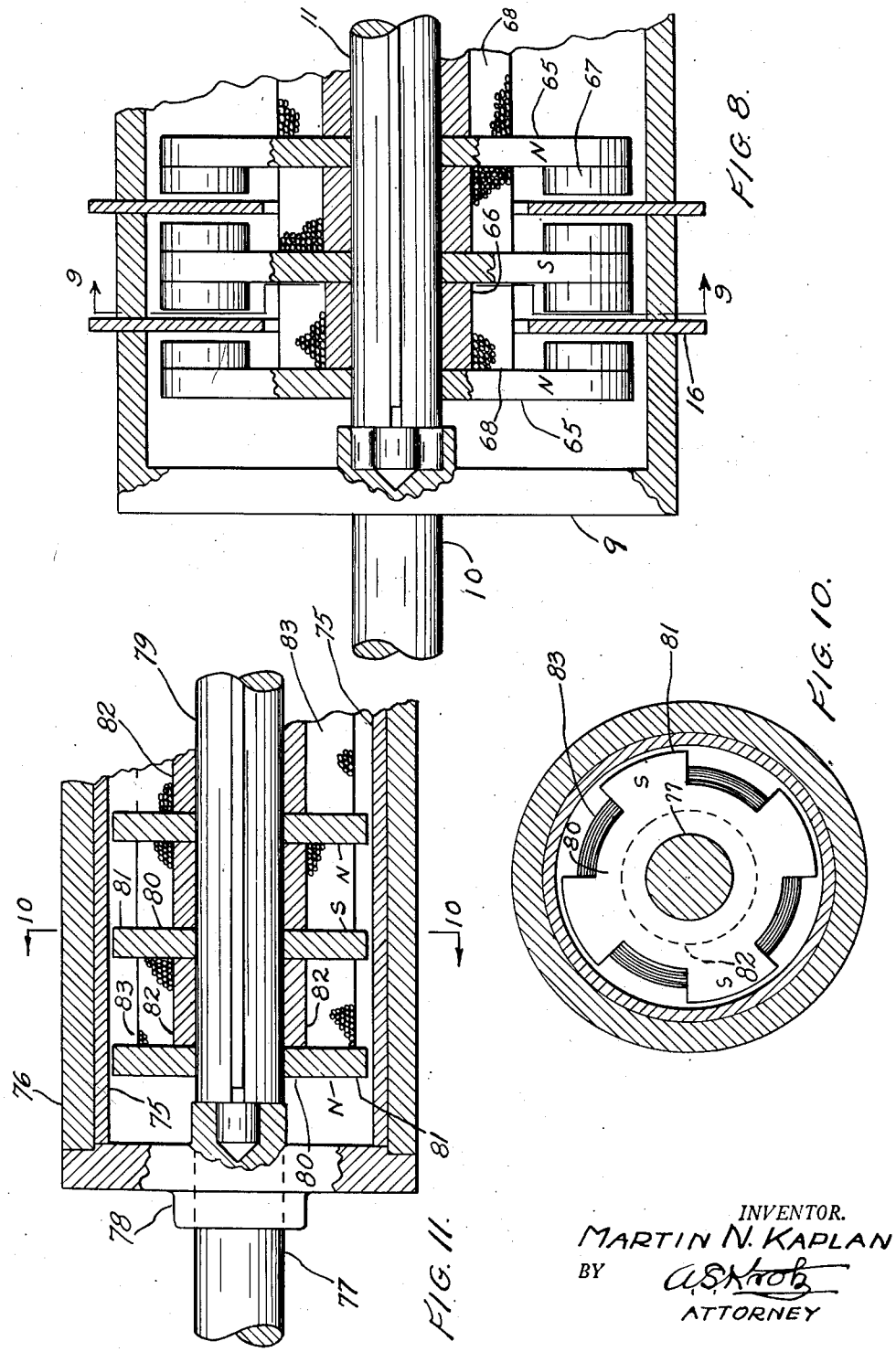

Jan. 12, 1954 M. N. KAPLAN 2,666,155
ELECTROMAGNETIC TRANSMISSION
Filed Feb. 3, 1951 5 Sheets-Sheet 5

INVENTOR.
MARTIN N. KAPLAN
BY
ATTORNEY

Patented Jan. 12, 1954

2,666,155

UNITED STATES PATENT OFFICE 2,666,155

ELECTROMAGNETIC TRANSMISSION

Martin N. Kaplan, Beloit, Wis.

Application February 3, 1951, Serial No. 209,294

5 Claims. (Cl. 310—105)

1

The present invention relates to an electromagnetic transmission for transmitting mechanical power at various speeds, speed ratios and torques, by means of one or more groups of magnets and thin discs, preferably serially and longitudinally arranged, and adapted to generate large currents in the discs which are preferably copper or the like, one positioned between each group of magnets, forming what I choose to call an electro-magnetic mechanical coupler, in which poles may be permanent magnets but preferably are magnets that are energized by an electric current of constant or variable intensity.

An object of the present invention is to provide a coupler wherein the driven element must be accelerated from standing to a speed nearly equal to the driving element, transmitting more or less torque depending upon the difference of speed between the elements or intensity of magnetic lines between adjacent magnets.

An important object of the present invention is to provide a clutch type locking means between the driving and driven elements, whereby a direct mechanical drive may be secured.

A further object of the present invention is to provide a transmission for a certain purpose wherein permanent magnets are used.

A further object of the present invention is to supply a multiple stage electro-magnetic transmission or coupler, wherein a controlled electric current is used for energizing the magnets, with means so there will be no drag with the engine idling, even when the transmission is in gear, or in other installations that are directly coupled.

Generally speaking, my stages are arranged serially in any number and in various diameters, however, they may be otherwise arranged, for example, in radially positioned stages. However, I have found that the serial arrangement of stages is preferable, largely because there are few limitations to the lengths or diameters available.

It will be understood that the conductivity discs may be mounted either on the driver or driven element, either design is encompassed by the intent and concept of this invention.

It will also be understood that the conductivity discs or elements may be mounted in such a manner that they extend into the space between the inner and an outer housing, whereby the heat generated by the current set up in these discs or conductivity elements may be dissipated by a liquid caused to pass through a radiator or otherwise, or the other housing may be perforated and the heat generated dissipated by the surrounding atmosphere.

An object of the present invention generally stated is to provide a simple induction transmission which is relatively small for its capacity, and will operate at any speed.

To these and other useful ends my invention consists of parts, combinations of parts, or their equivalents and mode of operation as hereinafter described and claimed and shown in the accompanying drawings in which:

Fig. 1 is a longitudinal section of one form of my electro-magnetic coupler, having a number of magnets and discs in longitudinal series.

Fig. 5 is a diagrammatic drawing illustrating a simplified form of means for energizing the magnets of a three stage coupler having means for disconnecting the energizing coils and for varying the intensity of the same.

Fig. 6 is another diagrammatic drawing illustrating one form of control for periodically energizing the magnets and manually controlling the same for automobile use.

Fig. 7 is an end sectional view taken on line 7—7 of Figure 1 illustrating one form of locking means between the driver and driven elements.

Fig. 8 illustrates fractionally and partly in section a modification of Figure 1.

Figs. 10 and 11 illustrate another modification.

Figures 1-3 illustrate the preferred form of my invention, wherein the driver member is designated in its entirety by reference character A. The driven member is in its entirety designated by reference character B.

Figure 3:
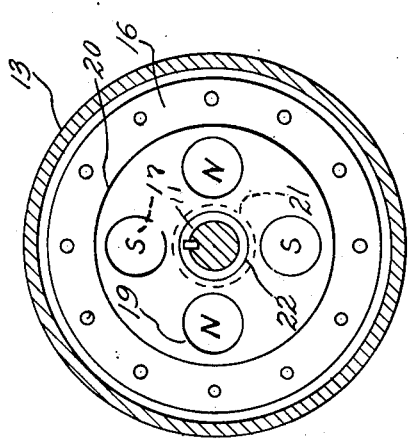
Fig. 3 is a section on line 3—3 of Figure 1.

The housing 9 of member A has rigidly mounted thereto a driving shaft 10. Driven member B has a shaft 11 on which housing A is rotatably mounted as at 12—12. A secondary housing 13 is preferably mounted on housing A and member 11 by means of bearings 14 and 15. The principal object of housing 13 is to provide a support for the device.

I mount on housing A preferably a number of spaced induction discs 16. The number of these discs is optional. Figure 1 is intended to represent three or more induction discs or stages, there being a disc 16 for each stage. These members have high electrical conductivity for obvious reasons.

I provide preferably electrically energized magnetic cores 17 having flanges 18, which are arranged circumferentially, four or more in groups, the cores each having a coil 19, and the cores and coils being mounted on non-magnetic discs 20 as illustrated in Figure 1. These discs are of non-magnetic material and are spaced longitudinally on shaft 11. Members 20 are secured to shaft 11 by means of collars 21, sleeves 22 and end magnetic conducting discs 23—23. These members and members 17 and 18 have low resistance to magnetic lines. Members 21, 22 and 23 are held from turning on shaft 11 by means of a key 11'.

It will be seen that the magnetic lines induced by coils 19 will pass through cores 17, flanges 18 and discs 16 serially into member 23 and then through collars 21 and 22 to the other disc 23 and when coils 19 are energized. When shaft 10 is revolved turning disc 16 through the lines of force passing from pole to pole an eddy current will be generated in the discs, which will act to turn shaft 11, creating torque in shaft 11 depending upon the difference in speed between shafts 10 and 11 and the intensity of the lines of force induced by coils 19 which are connected together and to an exterior source of electrical energy as will hereinafter appear.

Applicant's electro-magnetic multiple stage eddy current coupler circumvents all of the difficulties encountered in transmissions of similar character, largely because of its simplicity and simple means which may be provided for locking the driver and driven elements together for direct drive and at a predetermined speed of the driven element as will hereinafter appear.

A further advantage of applicant's device is the convenience for manually determining the density of magnetic lines for creating torque, and the absence of torque in my preferred design when the magnets are not energized electrically.

A still further advantage of applicant's device is that for certain purposes the device may be equipped with permanent magnets, so the resultant torque is entirely dependent upon the difference in speed between the driver and driven elements, having a disadvantage, in respect to my electrically energized unit particularly when used in automobiles and the like, because with permanent magnets there will be a slight torque regardless of how slow the engine turns, whereas with the electrically energized poles there will be no drag when the poles are not electrically energized.

As illustrated in Figure 1, the magnitude of magnetic lines depends upon the degree of saturation or volume of current passing through coils 19.

When my device is used on an automobile, I preferably provide simple means for controlling the magnetic saturation of the pole pieces as illustrated in Figure 5, wherein a conventional battery 28 is connected to coils 19 preferably in series by a wire 29.

Although in some installations the coils may be connected in multiple, the end of the series is connected to rheostat 30 by means of wire 31 as illustrated, the rheostat being controlled preferably by a manually or automatically controlled contact arm 32, which is connected to the battery by means of a wire 33. It will be seen that member 32 is shown in an open position and can be moved so as to close the circuit for a minimum saturation of the coils. Member 32 may then be moved along the contact points of rheostat 30 for determining the desired magnetic saturation of the poles.

Contact arm 32 may be automatically controlled. For example, by a mechanical connection to the gas pedal whereby when the engine is idling, arm 32 will be disconnected from the rheostat as shown and as the power pedal is depressed this contact will be closed and coils 19 will be automatically energized. Clearly rheostat 30 may be dispensed with and the coils controlled on the on and off principle and at full saturation.

Applicant's device is suitable for many methods of control; for example in Figure 6, I illustrate another method as follows:

When accelerator pedal 40 is depressed, the speed of engine 41 and generator 42 is increased and the generator voltage is increased above battery potential. Auxiliary relay 43 is adapted to close contacts 44 and 45. These contacts are protected from arcing by condenser 46 and resister 47. When contacts 44 and 45 are closed, field coils 19 are electrically energized. The resultant magnetic field has an angular velocity with respect to conductivity discs 16. The groups of magnetic lines passing through these discs will generate eddy currents in the discs resulting in torque causing the driven element to turn in the same direction as the driver element, thus driving the car through any conventional transmission.

When transmitting power the driven unit will always turn at less speed than the driver unit. It is therefore desirable particularly when used on an automobile or truck, to automatically lock the driver and driven elements together for what is generally called a direct drive, at any cruising speed. The preferred means for accomplishing direct drive heretofore recited is as follows:

I provide a centrifugally controlled clutch C (see Figures 1 and 7), which is adapted to lock the driving and driven members together after the driven member has reached a predetermined speed and to disengage these members when the driven member has dropped to a predetermined speed. These operations are brought about in a definite manner and quickly to prevent extended slippage and wear of the braking surfaces and by automatic means, which is provided with a lock in retractor 48. This lock in retractor is suitably connected to member C and having connections to the electric circuit so the field coils are disconnected when the clutch is engaged and connected again when the clutch is disengaged, thus to save waste of current during direct drive. In some installations, members C and 48 may be arranged for manual control. Figure 7 illustrates my preferred engaging and disengaging means, details of which will be furnished in another application.

Figure 11 illustrates my device as used on a conventional automobile or truck for warming the differential housing. An outer housing 55 largely surrounds the differential housing 56 forming an intervening chamber 57 which is connected to housing 13 by means of a tube 58. Another tube 59 forms a connection from the other end of housing 13 to housing 55, whereby the oil in chamber 13 may flow from one end of this chamber into chamber 57 and back again into housing 13 as illustrated. If found necessary, the edge of one or more of discs 16, which extend into chamber 13 (see Figure 1) may have formed thereon a multiplicity of slightly angled blades 60 thus to urge the oil to flow through the circuit just explained.

Various other uses may be made of the heat generated in my device by means of radiators or otherwise.

Figure 9:
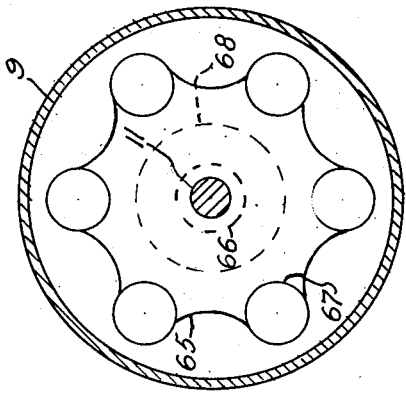
Fig. 9 is a section taken on lines 9—9 of Figure 8.
Figure 12:
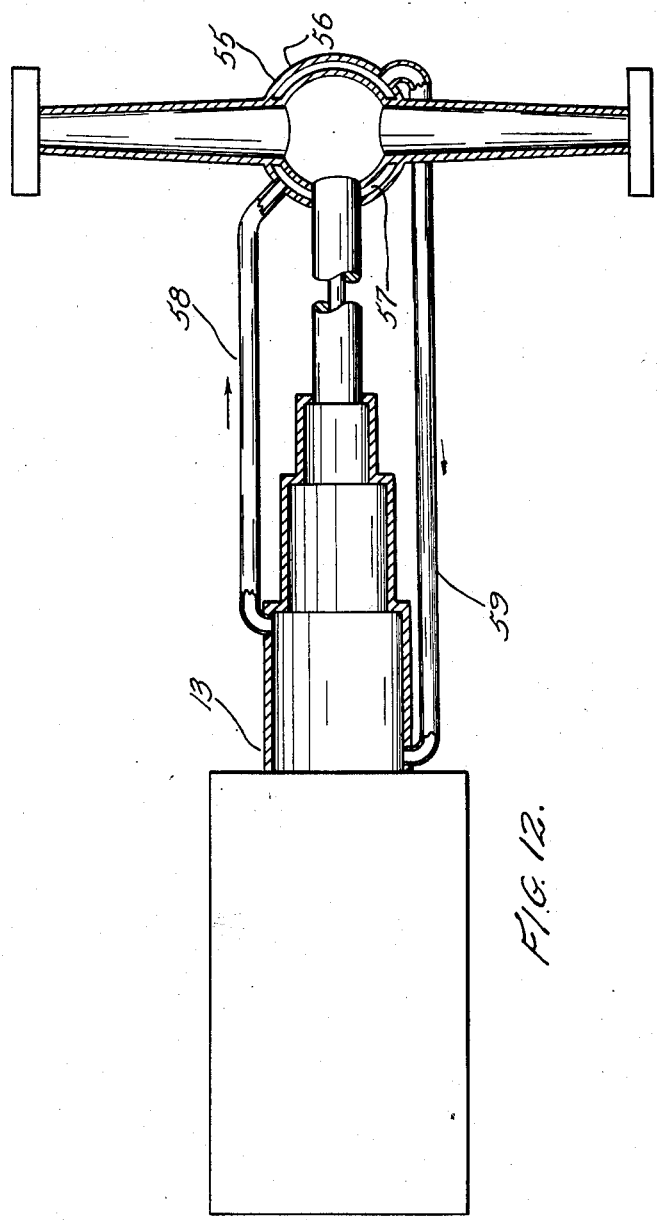
Fig. 12 illustrates means whereby the heat generated in the device may be transferred to a cooling radiator or to a means for heating other devices or accessories.

In Figures 8 and 9, I illustrate a modification. In this design pole discs 65 are spaced by collars 66, each being keyed to shaft 11. Member 9 is similar to design shown in Figure 1, having spaced discs 16 which are positioned between pads 67. Coils 68 are positioned between members 65 and are connected together and controlled as illustrated in Figures 5 or 6, so pole pieces 67 alternate, for example as shown, north, south, north, south, etc. Members 65, 66 and 67 offer low resistance to passage of magnetic lines, whereby the device will operate on discs 16 similar to that shown in Figure 1.

In Figures 10 and 11, I illustrate a modification, wherein instead if discs 16, I provide a tube 75 of high electric conductivity, which is snugly fitted into an outer tube 76 having high magnetic capacity. Members 75 and 76 are secured to shaft 77 by means of a flanged hub 78. The other element of the device is provided with a shaft 79 on which I mount in spaced relation, magnetic pole discs 80 having pole projections 81 and spacing sleeves 82, each of high magnetic conductivity.

Members 80 and 81 are held to shaft 79 in any convenient manner and being keyed thereto. Between each disc 80 and on sleeves 82, I mount coils 83 which are connected together preferably as illustrated in Figure 5 or 6 or in multiple, so members 81 will be electrically energized longitudinally alternately north, south, north, south, etc. Thus the lines of force which travel between north and south poles will, when one of the units is turned, generate groups of eddy currents in member 75.

If shaft 77 is the driving shaft, these groups of electric current will cause shaft 79 to turn in the same direction as shaft 77 and create torque, the amount of which will depend upon the difference in speed between the two shafts and the magnetic intensity of pole pieces 81.

It will be understood that alternate pole pieces will be positioned in longitudinal alignment. Thus clearly any number of groups of poles may be mounted on shaft 79 so the amount of power transmitted may be very large relative to the size of the unit.

Figure 4:
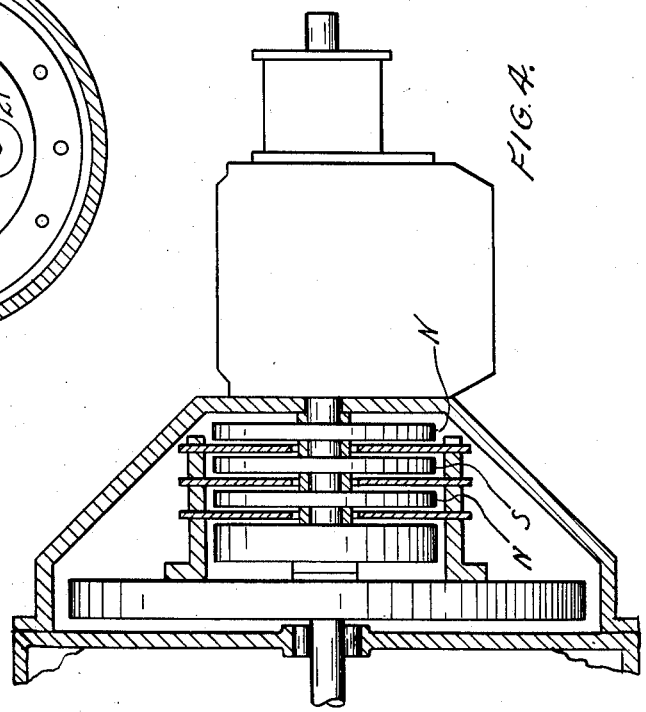
Figure 4 illustrates an application of my invention to an automobile, wherein permanent magnets are used for the fields.
Figure 2:
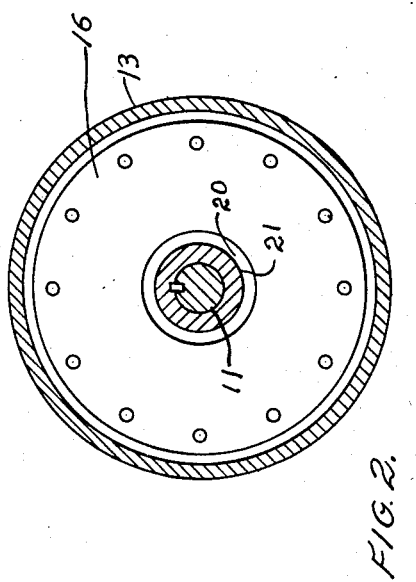
Fig. 2 is a section on line 2—2 of Figure 1.

In Figure 4, I illustrate an installation adapted for use on a conventional automobile, truck or tractor.

From the foregoing, it will be seen that my device may be designed with one or more stages, and may be designed with any number of groups of circumferentially arranged magnets arranged in longitudinal groups, the magnets being energized so the lines of force will travel in Figure 1 as follows: through the longitudinal groups of magnets between discs B and return through the sleeves 21 and 22. Sleeves 21 are magnetic spacers and sleeves 22 are also magnetic spacers but support the magnets. Some magnetic lines will pass through shaft 11. This description does not apply to Figure 8 wherein the magnetic lines pass through one magnet to another through disc 65 and spacer sleeve 66 in the direction indicated by N and S. For this purpose the coils must necessarily be positioned in reverse order.

Having thus shown and described my invention, I claim:

1. In an electro-magnetic transmission of the character described comprising in combination, elongated driving and driven elements, the driving element including a shaft and the driven element being concentrically positioned around the driving shaft and rotatably mounted at its ends on the driving shaft, spaced apart plates and spacing means for said plates secured to said driving shaft, a number of groups of magnets secured to said spacing means, the magnets of each group being mounted circumferentially in spaced relation, the magnets of said groups of magnets being arranged in longitudinal groups in spaced relation with said plates, forming narrow air gaps therebetween and forming magnetic circuits through the magnets, air gaps, plates and spacing means, said driven element having secured thereon thin annular discs having high electric conductivity and being freely positioned in said air gaps.

2. In a device as recited in claim 1 said magnet being of electro-magnetic type and having, energizing coils connected to an exterior source of electrical supply, and means for controlling the volume of current for changing the magnetic intensity of said magnets.

3. In an electro-magnetic transmission of the character described comprising in combination, elongated driving and driven elements, the driving element including a shaft and the driven element being concentrically positioned around the driving shaft and rotatably mounted at its ends on the driving shaft, spaced apart plates and spacing means for said plates secured to said driving shaft, a number of groups of magnets secured to said spacing means, the magnets of each group being mounted circumferentially in spaced relation, the magnets of said groups of magnets being arranged in longitudinal groups in spaced relation with said plates, forming narrow air gaps therebetween and forming magnetic circuits through the magnets, air gaps, plates and spacing means, said driven element having secured thereon thin annular discs having high electric conductivity and being freely positioned in said air gaps, locking means mounted on said driven element with means whereby the driven element will be locked to the driving element when the driven element reaches a predetermined speed relative to the driving element.

4. An electro-magnetic transmission of the character described comprising in combination, elongated driving and driven elements, one concentrically positioned around the other and being rotatably mounted together at their ends, spaced apart plates and spacing means for the plates secured to one of said elements, a number of groups of electro-magnets secured to said spacing means, the magnets of each group being mounted circumferentially in spaced relation, the magnets of said groups of magnets being arranged in longitudinal groups in spaced relation with said plates, forming narrow air gaps therebetween and forming magnetic circuits through the magnets, air gaps, plates and spacing means, the other element having secured thereto discs having high electric conductivity and being freely positioned in said air gaps, and means for connecting the coils of said electro-magnets to an exterior source of electric supply for energizing the same.

5. A transmission according to claim 1 and wherein portions of said conductivity discs extend into a ventilated space whereby heat generated in the discs is removed therefrom without introducing undesirable coupling between said driving and driven elements.

MARTIN N. KAPLAN.

References Cited in the file of this patent

UNITED STATES PATENTS

| Number | Name | Date |
|---|---|---|
| 908,707 | Steckel | Jan. 5, 1909 |
| 1,126,061 | Morrison | Jan. 26, 1915 |
| 2,355,484 | Teker | Aug. 8, 1944 |
| 2,487,551 | Hugin | Nov. 8, 1949 |

FOREIGN PATENTS

| Number | Country | Date |
|---|---|---|
| 509,726 | Great Britain | July 20, 1939 |
| 558,961 | Great Britain | Jan. 28, 1944 |